United States Patent [19]

Frese

[11] 4,110,524
[45] * Aug. 29, 1978

[54] DIRECT PRODUCTION OF POLYMORPH III OF ISOTACTIC POLYBUTENE-1

[75] Inventor: Albert Frese, Marl, Germany

[73] Assignee: Chemische Werks Huls A.G., Marl, Germany

[ * ] Notice: The portion of the term of this patent subsequent to , has been disclaimed.

[21] Appl. No.: 464,186

[22] Filed: Apr. 24, 1974

Related U.S. Application Data

[63] Continuation of Ser. No. 257,979, May 30, 1972, abandoned, and Ser. No. 799,972, Feb. 17, 1969, abandoned.

[30] Foreign Application Priority Data

Feb. 27, 1968 [DE] Fed. Rep. of Germany ....... 1720442

[51] Int. Cl.$^2$ .......................... C08F 2/06; C08F 10/08

[52] U.S. Cl. ................................. 526/158; 526/159; 526/348.6

[58] Field of Search ................... 260/94.9 B, 94.9 E, 260/93.7; 526/158, 159

[56] References Cited

U.S. PATENT DOCUMENTS

| | | | |
|---|---|---|---|
| 3,027,360 | 3/1962 | Raum | 260/94.9 B |
| 3,385,817 | 5/1968 | Jones | 260/94.9 B |
| 3,461,110 | 8/1969 | Rice et al. | 260/93.7 |

OTHER PUBLICATIONS

Boon et al., Polymer Letters, vol. 2, pp. 903–907 (1964).

*Primary Examiner*—Edward J. Smith
*Attorney, Agent, or Firm*—Millen & White

[57] ABSTRACT

High bulk density modification III of isotactic polybutene-1 is directly prepared by polymerizing butene-1 at 100°–200° C, preferably 140°–160° C, with a catalyst of: (a) titanium trichloride and (b) an alkyl aluminum compound.

11 Claims, No Drawings

DIRECT PRODUCTION OF POLYMORPH III OF ISOTACTIC POLYBUTENE-1

This is a continuation of application Ser. No. 257,979, filed May 30, 1972, now abandoned, and Ser. No. 799,972, filed Feb. 17, 1969, now abandoned.

BACKGROUND OF THE INVENTION

This invention relates to a process for the production of polymorph III of isotactic polybutene-1, said polymorph having an orthorhombic crystal structure.

It is known that isotactic polybutene-1 crystallizes in three polymorphic forms (Chim. e Ind., Milano, 43, 735 [1961]). From the melt, there is first obtained the unstable polymorph II and, after being stored at room temperature for one to ten days, is converted into the stable high-melting polymorph I. Polymorph III can be obtained from solutions of polybutene by crystallization, precipitation, freeze-drying or evaporation ("Kunststoffe" [Plastics] 55, 431 [1965]). Such processes, however, are very expensive and result in mixtures of the various polymorphs wherein polymorph III exists only in minor quantities. (In the prior art, the term "modification" is used interchangeably with the term "polymorph", and the two terms are intended to be synonomous also in the present invention.)

The most unusual property of polymorph III is its melting range of 90°–96° C as compared to 120–126 for II and 130–140 for I. Accordingly, polymorph III is particularly amenable to certain end-use processes, such as coating processes, especially fluidized bed coating and also for rotational casting. Moreover, since polymorph III, although stable below the melting point, is transformed later into the polymorph I (after first passing through polymorph II), the finished parts exhibit the advantageous properties of polymorph I, namely, high melting range, higher strength, higher hardness.

In addition to the fact that polymorph III can be processed under less severe conditions, another advantage is that due to its good solubility in hydrocarbons and chlorinated hydrocarbons, polymorph III is especially suitable for the production of polybutene adhesives and can be easily employed as a starting material in chemical reactions, such as chlorination processes.

SUMMARY OF THE INVENTION

An object of this invention, therefore, is to provide an improved process for the production of polymorph III of isotactic polybutene-1.

Another object is to provide a polymerization process wherein polymorph III is produced directly.

Upon further study of the specification and claims, other objects and advantages of the present invention will become apparent.

The above objects are attained by polymerizing butene-1 at 100°–200° C in the presence of a catalyst of titanium trichloride and alkyl aluminum compounds.

DETAILED DISCUSSION OF THE INVENTION

Suitable starting olefins include pure butene-1 as well as a mixture of butene-1 and butene-2, the lowest concentration of butene-1 in said mixture being preferably 30%. The higher the butene-1 content, the higher the polymerization reaction rate. Accordingly, when employing pure butene-1, the amount of catalyst used can be substantially reduced.

The polymerization is conducted in the liquid phase according to the Ziegler and Natta methods, sufficient pressure being applied to maintain said liquid phase at the polymerization temperature. Likewise, it is also possible to conduct the process in inert solvents, such as butane, hexane, isopropylcyclohexane and other hydrocarbons.

Very important to the success of the invention is the polymerization temperature of 100°–200° C, particularly 110°–170° C, preferably 140°–160° C.

Suitable catalysts are the conventional mixed catalysts from (a) violet $TiCl_3$ with a preferred particle size of below 50 μ or $TiCl_3 \cdot \frac{1}{3} AlCl_3$, and (b) alkyl aluminum halogenides, trialkyl aluminum compounds, or alkyl aluminum hydrides.

Examples of the aluminum compounds include, but are not limited to, tripropyl aluminum, dibutyl aluminum chloride, diisobutyl aluminum hydride, ethyl aluminum dichloride, preferred compounds being triethyl aluminum, diethyl aluminum chloride and ethyl aluminum sesquichloride. In general, the alkyl portion contains 1 to 8, especially 2 to 4 carbon atoms.

The catalyst components are generally employed in a molar ratio of Ti : Al of 1 : 0.5 to 1 : 3; preferably 1 : 1.0 to 1 : 1.4, especially 1 : 1.2 in case of triethyl aluminum, preferably 1 : 1.6 to 1 : 2.0, especially 1 : 1.8 in case of diethyl aluminum chloride, and preferably 1 : 2.5 to 1 : 2.9, especially 1 : 2.7 in case of ethyl aluminum sesquichloride.

The reaction is usually conducted until the molecular weight of polymorph III reaches about 50000 to 5000000, especially 100 000 to 3 000 000.

The polymerization can be conducted continuously or batchwise; the working-up operation being accomplished in accordance with conventional methods, for example, decomposition of the catalysts with methanol; washing; and drying.

In general, the final product resulting from polymerization contains about 70 to 100, preferably 80 to 100% polymorph III, 0 to 20, preferably 0 to 10 polymorph II; and 0 to 15, preferably 0 to 10 of polymorph I.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

EXAMPLE 1

Into a 50-liter pressure vessel (50 atmospheres gauge), equipped with an agitator, there is introduced 10 liters of hexane and then a mixture of 27.7 g. of titanium trichloride (3 $TiCl_3 \cdot AlCl_3$) with 36.9 g. of diethyl aluminum monochloride in 200 ml of hexane. Thereafter, there is introduced 20 l. of butene mixture having a butene-1 content of 60% (32% butene-2 and 8% butane). The vessel is heated to 110° C (pressure 19 atmospheres gauge). After a polymerization period of 5 hours, the autoclave is cooled to 30° C, and the charge is decomposed with 2 l. of methanol. The polybutene is separated, slurried into 25 l. of methanol, again separated, and dried at 50° C under a vacuum. A crystalline, fine-grained polybutene is obtained having a reduced viscosity of 1.5. The polybutene yield is 85.8% of which 80% is polymorph III.

If the polymerization is conducted at 150° C (27 atmospheres gauge) instead of 110° C, a polybutene is obtained at an 80% yield with 95% thereof being polymorph III. At a polymerization temperature of 170° C and a pressure of 30 atmospheres gauge, a polybutene is produced which crystallizes in the form of polymorph III to practically 100% and exhibits a bulk density of 228 g./l.; only traces of polymorphs I and II can be detected. At a polymerization temperature of 190° C, there is likewise obtained a polybutene containing practically 100% of polymorph III; however, the yield is somewhat lower at 190° C.

EXAMPLE 2

20 l. of a butene mixture having a butene-1 content of 49% (43% butene-2, 8% butane) is polymerized in 10 l. of hexane in the presence of a catalyst consisting of 27.7 g. of titanium trichloride (TiCl$_3$) and 24.5 g. of triethyl aluminum in 200 ml of hexane at 150° C. After a polymerization period of 5 hours, the mixture is worked up as described in Example 1, thus obtaining 5.5 kg (yield of 93%) of a crystalline polybutene having a reduced viscosity of 3.5, a polymorph III content of 95% and a bulk density of 235 g./l.

At 140° C, the yield is 95% of a crystalline polybutene having a reduced viscosity of 3.6, and 95% thereof being polymorph III. At a polymerization temperature of 160° C, a polybutene is obtained, of which practically 100% consists of polymorph III.

EXAMPLE 3

30 l. of a C$_4$-blend having a butene-1 content of 33% (58% of butene-2, 9% of butane) is polymerized for 5 hours at 150° C in the presence of a catalyst of 55.2 g. of titanium trichloride (3 TiCl$_3$ . AlCl$_3$) and 120 g. of ethyl aluminum sesquichloride, the latter being diluted with 800 ml of hexane. Subsequently, the reaction mixture is cooled to 40° C, decomposed with 2 l. of methanol, and the thus-obtained polybutene is separated in a suitable pressure-proof separating device. For purposes of additional purification, the polybutene is slurried with 20 l. of methanol and, after the separating step, dried under a vacuum at 50° C. There is obtained 1.1 kg of a crystalline polybutene having a reduced viscosity of 0.8.

The polybutene is present as 100% of polymorph III and exhibits a bulk density of 185 g./l.; only traces of polymorph I and II can be detected.

At 140° C as the polymerization temperature, a polybutene is obtained having 95% polymorph III; and at a polymerization temperature of 160° C, a polybutene is obtained having 100% polymorph III.

EXAMPLE 4

20 l. of a butene mixture having a butene-1 content of 49% is polymerized at 150° C in the presence of a preformed catalyst produced by reducing 7.6 g. of titanium tetrachloride with 6.9 g. of ethyl aluminum sesquichloride at 0° C, aging of the thus-obtained catalyst at 70° C for 8 hours, and subsequent treatment with 5.45 g. of triethyl aluminum at 20° C. After a polymerization time of 5 hours, the reaction mixture is worked up in accordance with Example 1, thus obtaining 1.5 kg of a crystalline polybutene, crystallizing in polymorph III to an extent of 95%.

As demonstrated by the examples, the advantage of this process resides in that it is now possible to produce polybutene-1 of polymorph III directly, in high yields and with great purity.

An additional advantage of the process of this invention, which could not be foreseen, resides in the thus-obtained high bulk density of the polybutene of 185 to 235 g./l. Actually this is opposite to previous experience, as disclosed in the older German published application (patent application No. C 35,885 IVd/39c) where the bulk density decreases with increasing polymerization temperatures as follows:

| Polymerization Temperature | Bulk Density |
|---|---|
| 20° C | about 300 g./l. |
| 30° C | about 250 g./l. |
| 40° C | about 130 g./l. |
| 60° C | about 80 g./l. |

In contrast, at a polymerization temperature of 100°–200° C the present invention provides bulk densities of 180 to 240 g./l.

Not only was the high bulk density not to be expected, but it was also surprising and could not be foreseen that a crystalline polybutene would be obtained at the high polymerization temperatures of this invention. For it was known from works of Natta (Chim. e Ind. 39, 1002–1012 [1957]) that poly-α-olefins of only very low crystallinity are obtained with catalysts of titanium trichloride and alkyl aluminum compounds at high polymerization temperatures. Of even greater contrast is the prior knowledge from DAS [German Published application] No. 1,240,667 (Table III, Comparative Tests 4 and 5) that, when using catalysts of titanium trichloride and alkyl aluminum halides at temperatures of 160° C, no polymerizate at all is formed when polymerizing propylene. Therefore, in the polymerization of butene-1, which was known to polymerize by means of these same catalysts at a rate even more slowly than propylene, there was substantial reason to have believed that butene-1 would not have polymerized to any degree, much less expect a high content of polymorph III.

However, it is possible, in accordance with this invention, to obtain, at 100°–200° C, crystalline polybutene in yields of 90% and thereabove. At a polymerization temperature of 110° C, the proportion of polymorph III ranges, depending on the catalyst employed, between 80 and 95%, and is 90–100% at 150° C, and at higher temperatures practically 100%.

Finally, contrary to experience in low-temperature olefin polymerization, polymerizates having higher molecular weights are obtained at polymerization temperatures of 100°–200° C with triethyl aluminum, but with chlorine-containing alkyl aluminum compounds, there are obtained polymerizates having lower molecular weights.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A process for the direct production of polybutene-1 containing about 70 to 100% of modification III, 0 to 20% of modification II, and 0 to 15% of modification I, and having a bulk density of 180–240 g/l, said process comprising polymerizing butene-1 at a polymerization temperature of 140°–200° C in the liquid phase in an inert hydrocarbon diluent in the presence of a catalyst consisting essentially of: (a) a titanium trichloride selected from the group consisting of violet $TiCl_3$ and $TiCl_3 \cdot 1/3\ AlCl_3$, and (b) an alkyl aluminum compound selected from the group consisting of an alkyl aluminum halogenide, a trialkyl aluminum, and an alkyl aluminum hydride, the molar ratio of (a) to (b) being about 1 : 0.5 to 1 : 3, said polymerizing being conducted substantially entirely at said polymerization temperature for a sufficient time to produce said polybutene-1 having a molecular weight of 50,000 to 5,000,000 measured by reduced viscosities, and then precipitating said polybutene-1 from said liquid phase.

2. A process as defined by claim 1, wherein the polymerization temperature is 140°–160° C. and wherein said precipitating is conducted by the cooling of the polymerizate and by addition of methanol.

3. A process as defined by claim 1 wherein (b) is triethyl aluminum and the molar ratio of (a) to (b) is 1 : 1.0 to 1 : 1.4.

4. A process as defined by claim 1 wherein (b) is diethyl aluminum chloride and the molar ratio of (a) to (b) is 1 : 1.6 to 1 : 2.0.

5. A process as defined by claim 1 wherein (b) is ethyl aluminum sesquichloride and the molar ratio of (a) to (b) is 1 : 2.5 to 1 : 2.9.

6. A process as defined by claim 1, wherein said titanium trichloride is violet $TiCl_3$.

7. A process as defined by claim 1, wherein said titanium trichloride is $TiCl_3 \cdot \frac{1}{3} AlCl_3$.

8. A process as defined by claim 7, wherein said alkyl aluminum compound is an alkyl aluminum halogenide.

9. A process as defined by claim 1, wherein said alkyl aluminum compound is an alkyl aluminum halogenide.

10. A process as defined by claim 1, wherein said inert hydrocarbon diluent is butane, hexane or isopropyl cyclohexane.

11. A process as defined by claim 1, wherein the polymerization temperature is 140°–160° C, and wherein said precipitating comprises cooling of the polymerizate.

* * * * *